United States Patent
Khokhar et al.

(10) Patent No.: US 10,353,610 B1
(45) Date of Patent: Jul. 16, 2019

(54) METHOD, APPARATUS AND COMPUTER PROGRAM PRODUCT FOR CONFIGURING A DATA STORAGE SYSTEM

(71) Applicant: EMC IP HOLDING COMPANY LLC, Hopkinton, MA (US)

(72) Inventors: Muzhar S. Khokhar, Shrewsbury, MA (US); Shyam Reddy, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 330 days.

(21) Appl. No.: 15/460,533

(22) Filed: Mar. 16, 2017

(51) Int. Cl.
*G06F 3/06* (2006.01)

(52) U.S. Cl.
CPC .......... *G06F 3/0631* (2013.01); *G06F 3/0604* (2013.01); *G06F 3/0673* (2013.01)

(58) Field of Classification Search
CPC .............................................. G06F 3/06–0689
See application file for complete search history.

(56) References Cited

U.S. PATENT DOCUMENTS

| 2012/0278668 A1* | 11/2012 | Chiu | G06F 12/02 714/700 |
| 2013/0312005 A1* | 11/2013 | Chiu | G06F 3/061 718/105 |
| 2014/0032837 A1* | 1/2014 | Nagasaki | G06F 3/0605 711/114 |

* cited by examiner

*Primary Examiner* — Nicholas J Simonetti
(74) *Attorney, Agent, or Firm* — Krishnendu Gupta

(57) ABSTRACT

There are disclosed techniques for use in configuring a data storage system. The techniques disclose defining a first workload including a first storage capacity requirement, a first IOPS requirement and a first skew value describing an expected workload profile. The techniques also disclose determining a percentage of the storage capacity requirement to be allocated from a storage tier based on a policy as well as allocating an amount of storage capacity from the storage tier in accordance with the percentage of the first storage capacity requirement. The techniques also disclose utilizing the first skew value to map the percentage of the first storage capacity requirement to a corresponding IOPS percentage to be handled by the storage tier. Further, the techniques disclose determining a first distribution of IOPS to the allocated storage capacity based on the IOPS percentage and the first IOPS requirement. The techniques further disclose determining, for a second workload, a second distribution of IOPS to the allocated storage capacity based on a second IOPS requirement and a second skew value and the first distribution of IOPS.

15 Claims, 4 Drawing Sheets

| LOOKUP TABLE 420 | |
|---|---|
| SKEW VALUE | PARAMETER(K) |
| ... | ... |
| 0.8 | 1.3 |
| ... | ... |
| ... | ... |

| MATRIX 430 | |
|---|---|
| CAPACITY 432 | K=1.3 434 |
| 0.1 | 0.67 |
| ... | ... |
| 0.18 | 0.77 |
| 0.2 | 0.8 |
| ... | ... |
| 0.32 | 0.86 |
| ... | ... |
| 1.0 | 1.0 |

FIG. 4

METHOD, APPARATUS AND COMPUTER PROGRAM PRODUCT FOR CONFIGURING A DATA STORAGE SYSTEM

TECHNICAL FIELD

The present invention relates to data storage. More particularly, the present invention relates to a method, an apparatus and a computer program product for configuring a data storage system.

BACKGROUND OF THE INVENTION

Data storage systems are arrangements of hardware and software that include storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, deleted, and so forth. Software running on the storage processors manages incoming storage requests and performs various data processing tasks to organize and secure the data elements stored on the non-volatile storage devices.

Some data storage systems use an assortment of data storage devices. Such data storage devices may have different performance characteristics and may be provided in respective storage tiers, with each storage tier including multiple storage devices that have similar characteristics. Each storage tier may contain a certain amount of data storage capacity, e.g., measured in gigabytes, terabytes, etc., and may include some number of storage drives to meet that capacity. As used herein, a "storage drive" is a physical device that stores data, such as an electronic flash drive, a SAS (Serial Attached SCSI—Small Computer System Interface) drive, an NL-SAS (Near Line SAS) drive, or a SATA (Serial Advanced Technology Attachment) drive, for example.

Data storage systems commonly have imbalanced, or skewed, distributions in the frequency with which various data elements are accessed. For example, in systems with high levels of skew, a small percentage of data elements are the target of a large percentage of IOPS (input/output operations per second). This can impact significantly on the performance of the data storage system. There is a need to address this problem.

SUMMARY OF THE INVENTION

There is disclosed a method, comprising: defining a first workload for a data storage system, wherein the first workload includes a first storage capacity requirement, a first TOPS (input-output operations per second) requirement and a first skew value describing an expected workload profile; determining, based on a policy, a percentage of the first storage capacity requirement to be allocated from a storage tier of the data storage system; in accordance with the percentage of the first storage capacity requirement, allocating an amount of storage capacity from the storage tier that satisfies at least part of the first storage capacity requirement; utilizing the first skew value to map the percentage of the first storage capacity requirement to a corresponding IOPS percentage to be handled by the storage tier, determining a first distribution of IOPS to the allocated storage capacity based on the IOPS percentage to be handled by the storage tier and the first IOPS requirement; defining a second workload for the data storage system, wherein the second workload is satisfied with the first storage capacity requirement and includes a second IOPS requirement and a second skew value describing an expected workload profile; and determining, based on the first distribution of IOPS and the second IOPS requirement and the second skew value, a second distribution of IOPS to the allocated storage capacity.

There is also disclosed an apparatus, comprising: memory; and processing circuitry coupled to the memory, the memory storing instructions which, when executed by the processing circuitry, cause the processing circuitry to: define a first workload for a data storage system, wherein the first workload includes a first storage capacity requirement, a first IOPS (input-output operations per second) requirement and a first skew value describing an expected workload profile; determine, based on a policy, a percentage of the first storage capacity requirement to be allocated from a storage tier of the data storage system; in accordance with the percentage of the first storage capacity requirement, allocate an amount of storage capacity from the storage tier that satisfies at least part of the first storage capacity requirement; utilize the first skew value to map the percentage of the first storage capacity requirement to a corresponding IOPS percentage to be handled by the storage tier; determine a first distribution of IOPS to the allocated storage capacity based on the IOPS percentage to be handled by the storage tier and the first IOPS requirement; define a second workload for the data storage system, wherein the second workload is satisfied with the first storage capacity requirement and includes a second IOPS requirement and a second skew value describing an expected workload profile; and determine, based on the first distribution of IOPS and the second IOPS requirement and the second skew value, a second distribution of IOPS to the allocated storage capacity.

There is also disclosed a computer program product including a set of non-transitory, computer-readable media having instructions which, when executed by processing circuitry, cause the processing circuitry to perform a method, the method comprising: defining a first workload for a data storage system, wherein the first workload includes a first storage capacity requirement, a first IOPS (input-output operations per second) requirement and a first skew value describing an expected workload profile; determining, based on a policy, a percentage of the first storage capacity requirement to be allocated from a storage tier of the data storage system; in accordance with the percentage of the first storage capacity requirement, allocating an amount of storage capacity from the storage tier that satisfies at least part of the first storage capacity requirement; utilizing the first skew value to map the percentage of the first storage capacity requirement to a corresponding IOPS percentage to be handled by the storage tier; determining a first distribution of IOPS to the allocated storage capacity based on the IOPS percentage to be handled by the storage tier and the first IOPS requirement; defining a second workload for the data storage system, wherein the second workload is satisfied with the first storage capacity requirement and includes a second IOPS requirement and a second skew value describing an expected workload profile; and determining, based on the first distribution of IOPS and the second IOPS requirement and the second skew value, a second distribution of IOPS to the allocated storage capacity.

BRIEF DESCRIPTION OF THE DRAWINGS

The foregoing and other features and advantages will be apparent from the following description of particular embodiments of the invention, as illustrated in the accompanying drawings, in which like reference characters refer to the same or similar parts throughout the different views.

FIG. 4 shows an example lookup table associating skew values with respective model parameters and an associated matrix to be used in embodiments disclosed herein.

DETAILED DESCRIPTION

Figure 1:
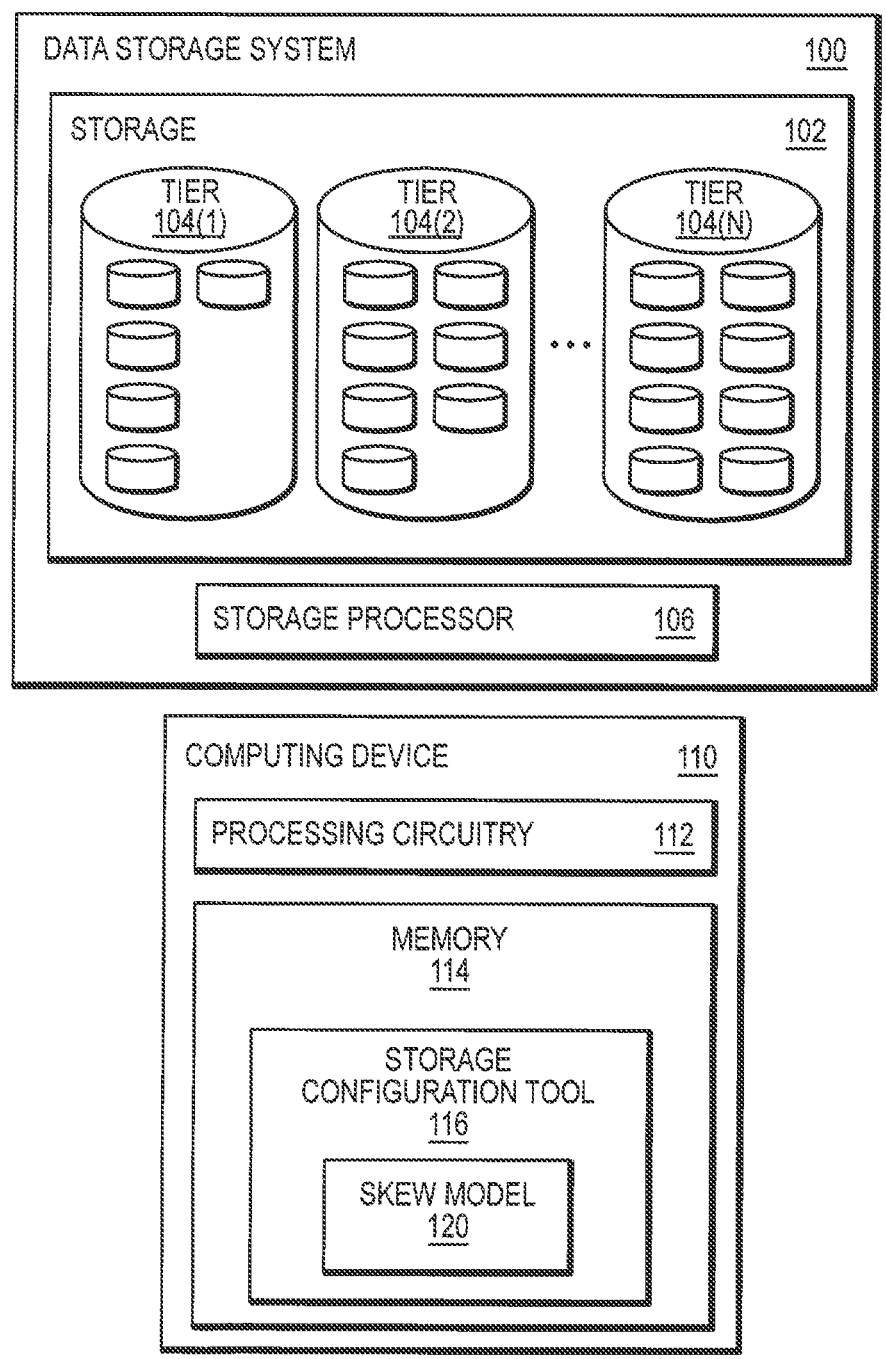
FIG. 1 is a block diagram of an example data storage system with multiple tiers of storage and of an example computer used to configure the data storage system.

FIG. 1 shows an example computing device 110 in which embodiments of the improved technique hereof can be practiced. FIG. 1 also shows an example tiered data storage system 100. The computing device 110 includes processing circuitry 112 and memory 114. The processing circuitry 112 may include one or more processing cores, chips, or assemblies. The memory 114 may be provided as both volatile and non-volatile memory. The computing device 110 may be implemented using any electronic device or machine capable of running software, such as a desktop computer, laptop computer, tablet computer, smart phone, and so forth.

The memory 114 "includes," i.e., realizes by operation of software instructions, a storage configuration tool 116, which includes or otherwise has access to a skew model 120. Users of the computing device 110 can operate the storage configuration tool 116 to generate configurations for particular data storage systems, e.g., the system 100, by applying the model 120 and one or more input values including the expected skew of the data storage system.

It should be understood that the techniques disclosed herein are applied to systems with two or more storage tiers and are not limited to any particular number of storage tiers. The data storage system 100 represents a system that is either being designed initially or that is being reconfigured, e.g., in an effort to repurpose the data storage system 100 for supporting a different application or set of applications. For simplicity, this document will hereafter refer to the data storage system 100 as something that actually exists, rather than as a design of a prospective system.

The data storage system 100 is seen to include storage 102 and a storage processor 106. The storage 102 includes storage tiers 104 (i.e., tiers 104(1) through 10 (N)). Each storage tier is composed of storage devices, such as magnetic disk drives, electronic flash drives, or the like. Each storage tier 104 has respective performance characteristics. Different storage tiers are distinguished from one another by their performance characteristics. For example, on storage tier may be composed of flash drives, another of SAS drives, and yet another of NL-SAS drives.

Figure 2A:
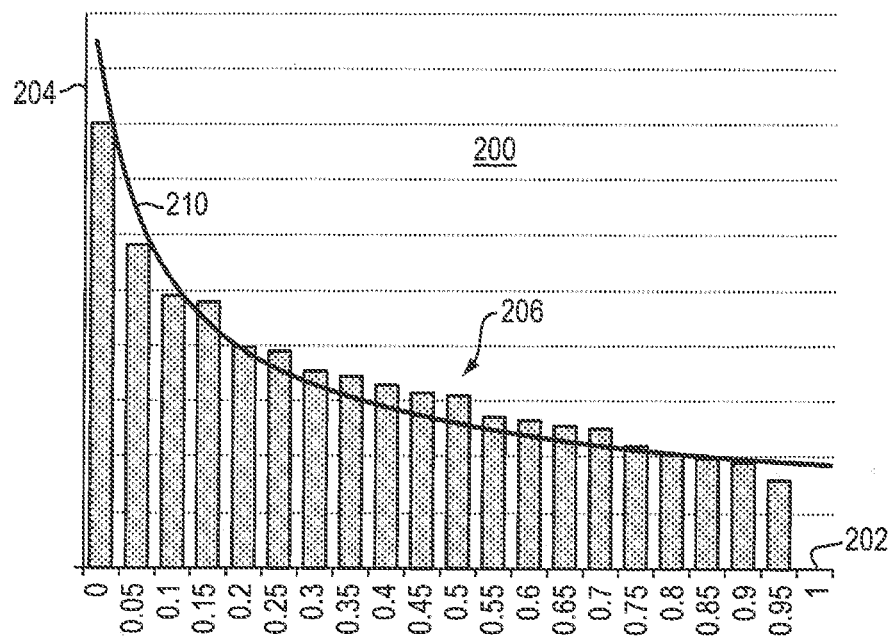
FIG. 2A is a graph showing an example relationship between IOPS (I/Os Per Second) and units of storage capacity in a data storage system.

FIG. 2A shows a graph 200 of the workload of an actual data storage system and a workload distribution 210 related to the workload. Percent increments of storage capacity are shown on horizontal axis 202, and percent increments in IOPs are shown on the vertical axis 204. Each bar 206 indicates a portion of total IOPS in the system directed to the corresponding portion of storage. For example, the height of each bar 206 indicates the relative frequency at which IO requests in the system access the corresponding increment of storage, with the sum of heights of all bars representing all of the IOPS in the system. The total of all increments of storage along the horizontal axis 204 represents all of the storage in the system. For instance, the figure depicts a system with 20 units of storage where each unit of storage forms 5% of the total capacity of the system. The bars 206 are ranked from tallest to shortest along the horizontal axis 202. The storage increments shown along the horizontal axis are not intended to correspond to particular disk drives. Rather, they may be regarded as extents of storage, which may be represented at any desired level of granularity and in any number.

In accordance with the skew model 120 (FIG. 1), a workload distribution 210 approximates the distribution of IOPS shown by bars 206 using a continuous curve. Thus, while bars 206 represent actual, discrete values of IOPS for corresponding percent capacity increments, workload distribution 210 approximates the same values as a continuous function.

In an example, the shape of the workload distribution 210 is defined by the skew model 120 and takes the general form $y=1/x^k$, which indicates a power law relationship between IOPS (presumed to be along the y-axis) and storage capacity (presumed to be along the x-axis), where 'k' is a parameter that may be adjusted to simulate different levels of skew. The shape of the workload distribution 210 depends on the value of k. For example, k=0 would correspond to a horizontal line, which means that IOPS are distributed evenly across all units of storage. Increasing values of k>0 result in steeper decay rates and higher levels of skew.

Figure 2B:
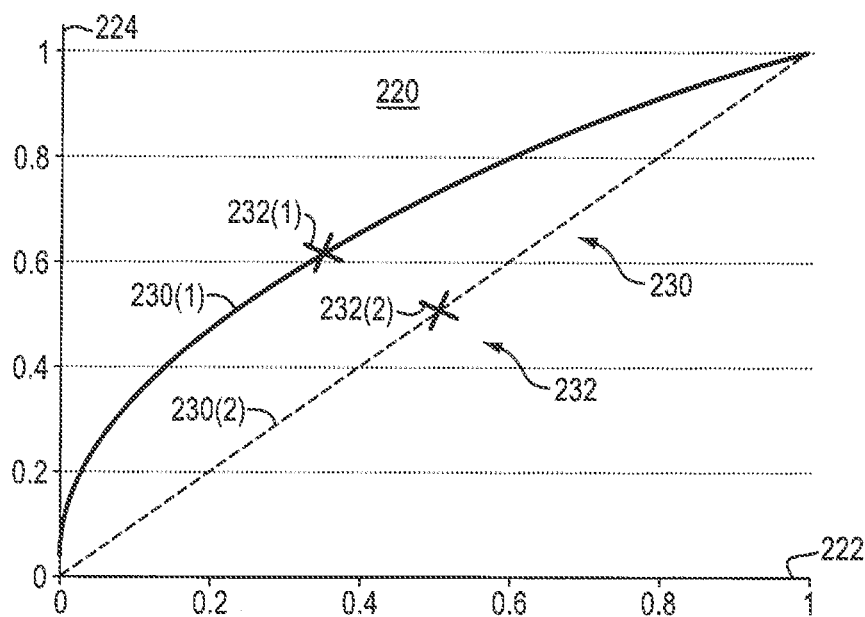
FIG. 2B is a graph showing an example relationship between cumulative percentages of IOPS and cumulative percentages of storage capacity in a data storage system.

FIG. 2B shows a graph 220 of a cumulative representation of the workload distribution 210. Units along horizontal axis 222 are the same as those shown in FIG. 2A. Values along a vertical axis 224 correspond to cumulative IOPS percentages. A skew curve 230(1) traces out a relationship between cumulative IOPS percentages and cumulative storage percentages for the same system represented by workload distribution 210. A skew curve 230(2) having no skew (k=0) is shown for comparison. Each point along either of the curves 230 relates a cumulative capacity percentage to a corresponding cumulative IOPS percentage, and vice-versa. In curve 230(2), for example, a cumulative capacity percentage of 0.5 (50%), accounts for 50% of all IOPS, as the system shown in curve 230(2) has no skew. Meanwhile, as shown in curve 230(1), 50% of the capacity accounts for approximately 70% of all IOPS, indicating a non-zero amount of skew. One should appreciate that a skew curve 230 may be computed as a discrete integral of curve 210 (FIG. 2A).

One may define a "skew point" 232 of a skew curve 230 as the point at which the cumulative IOPS percentage and the cumulative capacity percentage add to one. Given that total capacity is typically normalized to one (as in FIGS. 2A and 2B), the skew point may be expressed as the percent IOPS at which the sum of that percent IOPS and the corresponding percent capacity equals one. Using this definition, the skew point 232(2) of skew curve 230(2) is 50% because 50% of the IOPS are associated with 50% of the cumulative storage capacity (50%+50%=100%). Similarly, the skew point 232(1) of skew curve 230(1) is 62% because 62% of the IOPS are directed to 38% of the storage capacity (62%+38%=100%). While using this definition of the skew point to define a level of skew is convenient, it should be understood that many other definitions are suitable. Also, one should appreciate that a given skew point 232 uniquely identifies one and only one skew curve 230, which in turn uniquely identifies one and only one workload distribution 210.

Figure 3:
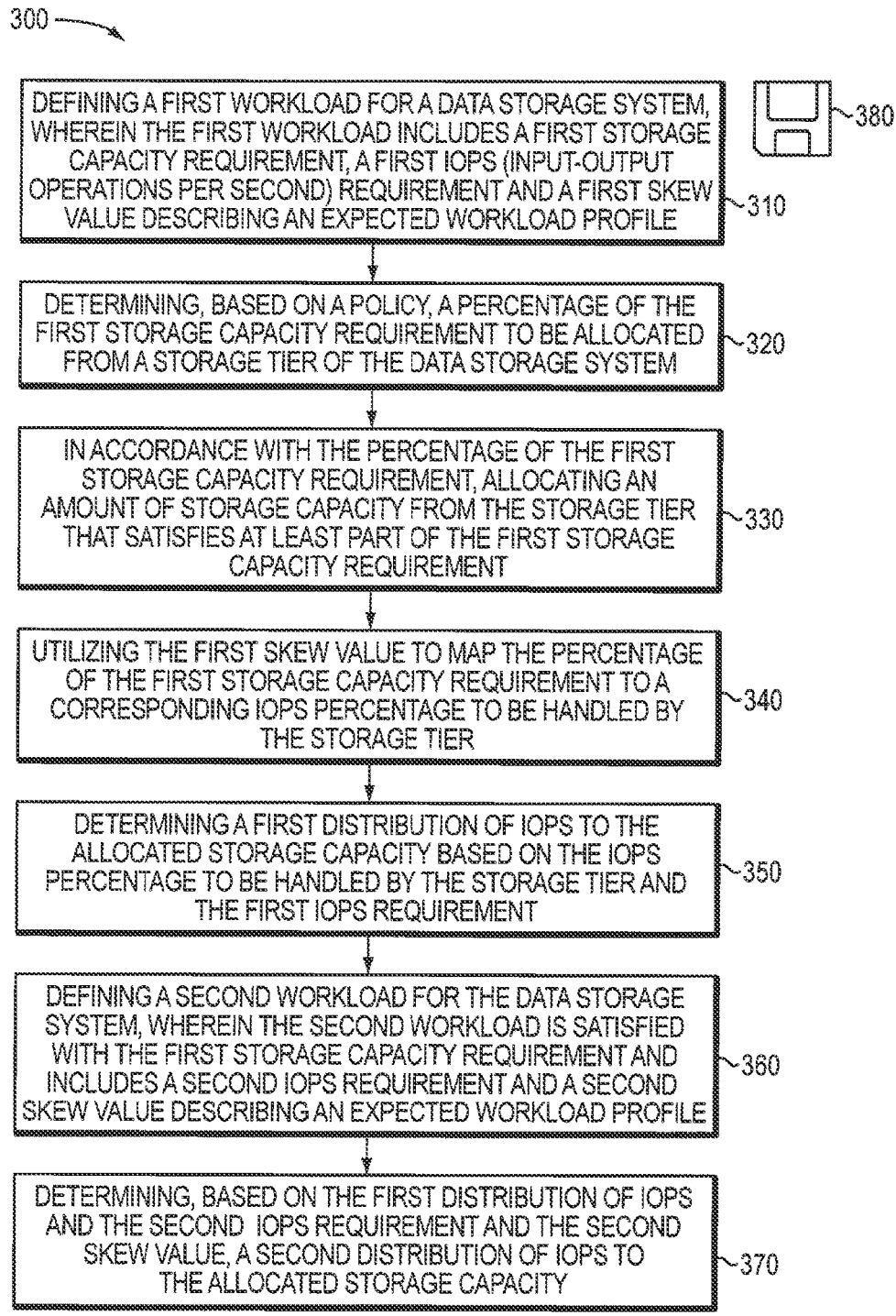
FIG. 3 is a flowchart showing an example method disclosed herein.

FIG. 3 shows an example method 300 of configuring a data storage system 100. The method 300 may be carried out, for example, by the storage configuration tool 116, which resides in the memory 114 of the computing device 110 and is run by the processing circuitry 112. The method 300 contains acts 310, 320, 330, 340, 350, 360 and 370.

At step 310, a first workload is defined for a data storage system that includes a first storage capacity requirement, a first IOPS (input-output operations per second) requirement and a first skew value describing an expected workload profile. At step 320, a percentage of the first storage capacity requirement to be allocated from a storage tier of the data storage system is determined based on a policy. At step 330, in accordance with the percentage of the first storage capacity requirement, an amount of storage capacity is allocated from the storage tier that satisfies at least part of the first storage capacity requirement. At step 340, the first skew value is utilized to map the percentage of the first storage capacity requirement to a corresponding IOPS percentage to be handled by the storage tier. At step 350, a first distribution of IOPS to the allocated storage capacity is determined based on the IOPS percentage to be handled by the storage tier and the first IOPS requirement. At step 360, a second workload for the data storage system is defined. The second workload is satisfied with the first storage capacity requirement and includes a second IOPS requirement and a second skew value describing an expected workload profile. At step 370, a second distribution of IOPS to the allocated storage capacity is determined based on the first distribution of IOPS and the second IOPS requirement and the second skew value.

In use, the computing device 110 defines the first workload including the first storage capacity requirement, the first IOPS requirement as well as the first skew value describing the expected workload. For example, the first workload as defined may be based on historical workloads as observed by the data storage system or it may be based on a request from a user that describes the first workload. Upon defining the first workload, the computing device 110 uses the defined first workload to determine relative percentages of the first storage capacity requirement to be satisfied by respective one or more storage tiers in the data storage system based on a policy. For example, if the data storage system comprises multiple storage tiers, each storage tier may satisfy a portion of the first storage capacity requirement. Alternatively, the first storage capacity requirement may be satisfied by one or a subset of the multiple storage tiers in the data storage system. This determination will, ultimately, be based on a policy as will be discussed further below.

Next, and in accordance with the relative percentages, the computing device 110 facilitates the allocation of respective amounts of storage capacity from the one or more storage tiers that satisfies the first storage capacity requirement. It should be noted from above that the first workload as defined comprises a first storage capacity requirement among other requirements. For example, the first storage capacity requirement may specify a number of GB's required by the first workload. The computing device 110 uses this number and the respective percentages to calculate the amount to be allocated from free storage capacity associated with the respective storage tiers.

Also, the computing device 110 maps the storage capacity percentages to IOPS percentages by identifying the parameter value ('k' in the relationship $y=1/x^k$) that the skew model 120 associates with the skew value of the first workload and converting capacity percentages to IOPS percentages using the skew model 120 and the parameter value 'k'. Once the IOPS percentages are known, the computing device 110 then proceeds to determine a first distribution of IOPS to the allocated storage capacity based on the IOPS percentage to be handled by the storage tier and the first IOPS requirement. For example, it should be understood from the above that the first IOPS requirement of the first workload as defined may specify a number of IOPS such that the first distribution to respective tiers may be a percentage of that number.

Additionally, the computing device 110 defines a second workload that may be an additional load to be applied to the data storage system that does not require additional capacity. Here, the second workload for the data storage system includes a second IOPS requirement and a second skew value describing an expected workload profile. It does not, however, require additional capacity over and above the first storage capacity requirement. Once the second workload is defined, the computing device 110 in turn determines, based on the first distribution of IOPS and the second IOPS requirement and the second skew value, a second distribution of IOPS to the allocated storage capacity. The second distribution may relate to the amount of IOPS to be handled by each storage tier in the data storage system in light of the second workload.

With respect to the second workload, it should be noted that the second workload may be nothing more than an additional load to the data storage system but as noted above there will not be any extra capacity requirement. For example, suppose initially there is first workload defined that includes a first storage capacity requirement of 100 TB for all employee email accounts and a first IOPS requirement of 20K IOPS. Now, if an additional 5K employees are added to the company, it may be decided that the existing storage capacity requirement of 100 TB is sufficient to store the mail boxes but that the data storage system will need to be configured to serve an additional 10K IOPS. This requires a second distribution of IOPS to the allocated storage capacity to be determined based on the first distribution of IOPS and the second IOPS requirement and the second skew value.

It should be understood that in at least one embodiment the second distribution of IOPS is determined by fetching the capacity percentage distribution between the storage tiers in connection with the first workload and getting the capacity percentage allocated to a particular storage tier from the fetched first workload distribution. Next, based on the second skew value and the said capacity percentage, it is necessary to find out the IOPS percentage to be allocated from that particular storage tier. Once this step is complete, the IOPS allocated from the storage tier for the first and the second workloads are added. The steps may be repeated for the other storage tiers in the data storage system. This will be described further below.

Furthermore, as discussed above, a policy determines the relative percentages of the first storage capacity requirement to be satisfied by storage tier(s) in the data storage system. Such a policy, in at least one embodiment, requires the first storage capacity requirement to be satisfied by one or more storage tiers in order of the highest to the lowest performing storage tiers (or vice versa) in the data storage system. To this end, the highest performing storage tier should satisfy as much of the first storage capacity requirement as the storage tier can manage from free storage capacity associated therewith before attempting to satisfy the rest of the first storage capacity requirement from the next highest performing storage tier and so on. As a result, suppose a storage tier is the highest performing storage tier in the data storage system, and the storage tier possesses enough free storage capacity to satisfy the first storage capacity requirement, it will be determined in such an example that the storage tier should satisfy the entire first storage capacity requirement by allocating free storage capacity therefrom. However, if the storage tier cannot satisfy all of the first storage capacity requirement, it will be determined to satisfy a portion of the first storage capacity requirement by allocating all the free storage capacity in connection with the storage tier before attempting to satisfy a remaining portion of the first storage capacity requirement with free storage capacity associated with the next highest performing storage tier and so on.

Furthermore, it should be appreciated that in another embodiment the policy may require the process of satisfying the first storage capacity requirement to start with the lowest performing storage tier and if appropriate move to the next lowest performing storage tier and so on. This policy is essentially the reverse of the embodiment above in which the policy requires the process to start at the highest performing storage tier.

Additionally, it should be appreciated that in another embodiment the policy requires each of the multiple storage tiers to satisfy the first storage capacity requirement by allocating free storage capacity therefrom such that each storage tier handles respective portions of the first storage capacity requirement with each portion being in the ratio of the free storage capacity of that storage tier to a total aggregated free storage capacity in connection with the multiple storage tiers. The policy (hereinafter referred to as an 'auto' policy) may require a percentage of free storage capacity to be allocated from each of the multiple storage tiers such that each storage tier handles a percentage based on the free storage capacity of the particular storage tier and the aggregated free storage capacity of all the storage tiers in the data storage system. Still further, the auto policy may require one storage tier to satisfy the entire storage capacity requirement if the storage capacity requirement is less than a fraction of the free storage capacity of the one storage tier (e.g., the storage capacity requirement is less than half the free storage capacity of the storage tier). For example, in one embodiment, the one storage tier may be the 'highest' performing storage tier.

While the above describes an additional second workload, it should be noted that notwithstanding such discussions the 'highest to lowest' or the 'lowest to highest' policy may be configured to satisfy the first storage capacity requirements in the event that the first workload is described as a sole load or a single load. The user may also be able to selectively override any policy at any stage.

By way of example of the above method, suppose the data storage system comprises three storage tiers in a storage pool and applies an 'auto' tiering policy as described above. Further, suppose the three storage tiers include a first FLASH tier comprising a free capacity of 22928 GB, a second SAS tier comprising free capacity of 17168 GB and a third NL-SAS tier comprising free capacity of 87517 GB. Also, suppose a first workload is defined as including a first storage capacity requirement of 107483 GB, a first IOPS requirement is 20,000 IOPS and a first skew of 80% IO and 20% capacity [0.8:0.2] that results in the parameter k being calculated as 1.3. Thus, in such an example, the method may be implemented as follows:

Tier-1:
  Tier-1 relative Capacity %=(FLASH Tier free capacity/Pool free capacity)=17.96%, ratio 0.1796
  Tier-1 Capacity allocated=(Tier-1 relative Capacity %*First Storage Capacity Requirement)=19311.29 GB
  For the given Capacity % "X" and the parameter k, get the IOPS % "Y" of Flash tier which is 76.98% [ratio 0.7698]
  Tier-1 IOPS=(First IOPS Requirement*IOPS % of Flash tier)=20000*0.7698=15396 IOPS
  Tier-2 relative Capacity %=(SAS Tier free capacity/Pool free capacity)=13.45%, ratio 0.1345
  Tier-2 Capacity allocated=(Tier-2 relative Capacity %*First Storage Capacity Requirement)=14459 GB
  For the given Capacity % "X" and the parameter k, get IOPS % "Y".
  Here, consider Tier-1 relative capacity %+Tier-2 relative capacity % to skew curve, then later reduce Tier-1 IOPS % ["Y"] from the total.
  Total relative capacity %=(tier-1 relative capacity %+tier-2 relative capacity %)=17.96+13.45=31.45%−☐ this becomes the X % (capacity %)
  Y %=85.88% at k=1.3 and X %=31.45
  Now the SAS tier %=(Total relative Y %−Flash tier IOPs %)=85.88−76.98=8.90%.
  The IOPS % of SAS tier is 8.90% [ratio 0.08908]
  Tier-2 IOPS=(First IOPS Requirement*IOPS % of SAS tier)=20000*0.08908=1781 IOPS
Tier-3:
  Allocate remaining First Storage Capacity Requirements and First IOPS Requirements to last tier.
  Tier-3 Capacity allocated=(First Storage Capacity Requirement−(Tier-1 Capacity allocated+Tier-2 Capacity allocated))=73711 GB
  Tier-3—NL-SAS IOPS=(First IOPS Requirement−(Tier-1 IOPS+Tier-2 IOPS)=2823 IOPS Additionally, suppose an additional second workload is to be applied to the data storage system that does not require any extra storage capacity requirements over and above those associated with the first storage capacity requirements in connection with the first workload. For example, the above initial first storage capacity requirement of 107483 GB in connection with the first workload is sufficient. However, as a result of the second workload, the system is required to serve an additional second storage capacity requirement of 10K IOPS and have a required skew of 90% IO and 10% capacity that results in the parameter k being calculated as 1.91. This will require further steps, as follows:
Tier-1:
  Tier-1 relative Capacity %=17.96%, ratio 0.1796
  For the given Capacity % "X" and k=1.91 from the skew curve, get IO % "Y".
  The IOPS % of Flash tier is 93.52% [ratio 0.9352]
  Tier-1 IOPS=(Second IOPS Requirement*IOPS % of Flash tier)=10000*0.9352=9352
  Total Tier-1 IOPS=15396+9352=24748
Tier-2:
  Tier-2 relative Capacity %=13.45%, ratio 0.1345
  For the given Capacity % "X" and k=1.91 from the skew curve, get IO % "Y".
  Here, consider Tier-1 relative capacity %+Tier-2 relative capacity % to skew curve, then later reduce Tier-1 IO % ["Y"] from the total.
  Total relative capacity %=(tier-1 relative capacity %+tier-2 relative capacity %)=17.96+13.45=31.45%−☐ this becomes the X % (capacity %)

Total relative Y % at give k=1.91 and X % 31.45, find out Y %. Here, from the curve, the Y %=96.79%
Now the SAS tier %=(Total relative Y %−Flash tier IOPs %)=96.79−93.52=3.27%.
The IOPS % of SAS tier is 3.27% [ratio 0.0327]
Tier-2 IOPS=(Second IOPS Requirement*IOPS % of SAS tier)=10000*0.0327=327
Total Tier-2 IOPS=1781+327=2108

Tier-3:
Allocate remaining Second Storage Capacity Requirement and Second IOPS Requirement to last tier.
Tier-3—NL-SAS IOPS=(Second IOPS Requirement−(Tier-1 IOPS+Tier-2 IOPS)=321
Total Tier-3 IOPS=2823+321=3144

FIG. 4 shows an example lookup table 420 which associates skew values with values for the parameter 'k'. In the example lookup table 420, the skew values are skew points 232 as defined above. As discussed above, a skew value equal to 0.50 (i.e., 50%) corresponds to a system with no skew and a parameter value of k=0. Meanwhile, a skew value of 0.8 (or 80%) corresponds to a parameter value of k=1.3 as illustrated in the figure.

The figure also shows an example matrix 430. The matrix 430 includes column 434 storing IOPS percentages corresponding to respective capacity percentages in column 432. The column 434 is associated with a respective value of the parameter 'k.' One skilled in the art will appreciate that IOPS values of column 434 together with the respective capacity values in column 432 represent points on a skew curve for a system whose skew level is described by the parameter 'k'.

Just as lookup table 420 associates a skew value of 0.8 with k=1.3, so the column 434 of matrix 430 associated with k=1.3, represents points on a skew curve for a system with a skew point of 80% (i.e., 0.8+0.2=1). It should be understood that in this particular embodiment the column 434 as displayed includes a value 0.8 corresponding to a capacity value of 0.2. It should be further understood that all numerical values shown in FIG. 4 are for the purposes of illustration and are not necessarily precise. Along these lines, lookup table 420 has only a limited number of entries for the purposes of illustration. Similarly, matrix 430 has a limited number of rows and columns for the purposes of illustration.

As illustrated, in some arrangements, the parameter value is identified by accessing a lookup table, such as the lookup table 420 shown in FIG. 4, that associates skew values with respective parameter values and selecting, as the identified parameter value, a parameter value that the lookup table associates with a skew value nearest in value to the skew value.

In these arrangements the identified parameter value is used to access a matrix, such as matrix 430 shown in FIG. 4. The matrix 430 may have multiple columns 434 storing respective IOPS percentages for respective capacity percentages 432. Each column 434 is associated with a respective parameter value ('k'). The system then outputs, as each IOPS percentage to be handled by the respective storage tier, the IOPS percentage corresponding to the respective capacity percentage 432 belonging to the matrix 430. The distribution of IOPS to the allocated storage capacity of the respective tiers is determined based on the outputted LOPS percentage and the IOPS requirement.

It should also be understood that the parameter value ('k') in at least one embodiment is identified by means of performing a computation. For example, the storage configuration tool 116 receives the skew value. The storage configuration tool 116 uses the skew model 120 to calculate a workload distribution using a candidate parameter value. The calculated workload distribution is then used to calculate a skew curve 230. The storage configuration tool 116 measures the skew point (or other suitable skew value) for that curve and compares it with the received skew value.

If the skew point of the calculated skew curve is less than the received skew value, candidate parameter value is increased, and the process is repeated until the skew point of the calculated skew curve is greater or equal to the received skew value. Once the skew point of the calculated skew curve is greater or equal to the received skew value, the identified parameter value is outputted.

Having described certain embodiments, numerous alternative embodiments or variations can be made. Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media 380 as shown, for example in FIG. 3, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like. Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:
1. A method, comprising:
defining a first workload for a data storage system, wherein the first workload includes a first storage capacity requirement, a first IOPS (input-output opera- tions per second) requirement and a first skew value describing an expected workload profile;

determining, based on a policy, a percentage of the first storage capacity requirement to be allocated from a storage tier of the data storage system;

in accordance with the percentage of the first storage capacity requirement, allocating an amount of storage capacity from the storage tier that satisfies at least part of the first storage capacity requirement;

utilizing the first skew value to map the percentage of the first storage capacity requirement to a corresponding IOPS percentage to be handled by the storage tier;

determining a first distribution of IOPS to the allocated storage capacity based on the IOPS percentage to be handled by the storage tier and the first IOPS requirement;

defining a second workload for the data storage system, wherein the second workload is satisfied with the first storage capacity requirement and includes a second IOPS requirement and a second skew value describing an expected workload profile; and determining, based on the first distribution of IOPS and the second IOPS requirement and the second skew value, a second distribution of IOPS to the allocated storage capacity.

2. The method as claimed in claim 1, wherein the policy requires the storage tier to satisfy as much of the first storage capacity requirement as the storage tier can manage from free storage capacity associated therewith, and wherein determining, based on a policy, a percentage of the first storage capacity requirement to be allocated from a storage tier of the data storage system, comprises:

comparing the free storage capacity of the storage tier and the first storage capacity requirement;

based on the comparison and the policy, determining an amount of the free storage capacity to allocate in order to satisfy at least a portion of the first storage capacity requirement; and determining the percentage of the first storage capacity requirement based on the amount of the free storage capacity to be allocated and the first storage capacity requirement.

3. The method as claimed in claim 2, wherein the amount of the free storage capacity corresponds to the first storage capacity requirement upon the comparison indicating that the first storage capacity requirement is less than or equal the free storage capacity of the storage tier.

4. The method as claimed in claim 2, wherein the amount of the free storage capacity corresponds to a portion of the first storage capacity requirement equal in size to the free storage capacity upon the comparison indicating that the first storage capacity requirement is greater than the free storage capacity of the storage tier.

5. The method as claimed in claim 4, wherein the storage tier is the lowest or highest performing storage tier of multiple storage tiers in the data storage system and the policy requires the storage tier to satisfy as much of the first storage capacity requirement as the storage tier can manage from free storage capacity associated therewith before attempting to satisfy a remaining portion of the first storage capacity requirement from a next lowest or highest performing storage tier of the multiple storage tiers, further comprising:

determining the remaining portion of the first storage capacity requirement not satisfied by the storage tier;

based on remaining portion of the first storage capacity requirement and the policy, determining an amount of free storage capacity associated with the next lowest or highest performing storage tier to be allocated from that storage tier in order to satisfy at least a portion of the remaining portion of the first storage capacity requirement; and determining a percentage of the first storage capacity requirement to be allocated from the next lowest or highest performing storage tier based on the amount of free capacity to be allocated from that storage tier and the first storage capacity requirement.

6. The method as claimed in claim 1, wherein the storage tier is one of multiple storage tiers in the data storage system and the policy requires each of the multiple storage tiers to satisfy the first storage capacity requirement by allocating free storage capacity therefrom such that each storage tier handles respective portions of the first storage capacity requirement with each portion being in the ratio of the free storage capacity of that storage tier to a total aggregated free storage capacity in connection with the multiple storage tiers, and wherein determining, based on a policy, a percentage of the first storage capacity requirement to be allocated from a storage tier of the data storage system, comprises:

determining free storage capacity in connection with the storage tier;

determining a total aggregated free storage capacity in connection with the multiple storage tiers; and in order to implement the policy, determining the percentage of the first storage capacity requirement based on the free storage capacity in connection with the storage tier and the total aggregated free storage capacity in connection with the multiple storage tiers.

7. The method as claimed in claim 1, wherein the policy requires the storage tier to satisfy the entire first storage capacity requirement in the event that the first storage capacity requirement is less than a fraction of a free storage capacity of the storage tier, and wherein determining, based on a policy, a percentage of the first storage capacity requirement to be allocated from a storage tier of the data storage system, comprises:

comparing the free storage capacity of the storage tier and the fraction of the free storage capacity of the storage tier; and based on the policy and the comparison indicating that the first storage capacity requirement is less than the fraction of the free storage capacity of the storage tier, determining to allocate a portion of the free storage capacity of the storage tier to satisfy the entire first storage capacity requirement.

8. The method as claimed in claim 1, wherein the skew value relates to an expected workload profile of the data storage system; and wherein utilizing the skew value to map the percentage of the storage capacity requirement to the corresponding IOPS percentage to be handled by the storage tier, comprises:

providing a skew model, wherein the skew model (i) defines a respective relationship between capacity percentages and IOPS percentages for each of multiple levels of skew and (ii) associates a respective parameter value with each of the multiple levels of skew;

identifying a parameter value that the skew model associates with the skew value; and converting the storage capacity percentage to the corresponding IOPS percentage by applying the skew model with the identified parameter value.

9. The method as claimed in claim 8, wherein the skew model approximates data storage system skew for each parameter value as a power law relationship between incremental capacity percentages and respective IOPS percentages with capacity percentages ranked in descending order based on their respective IOPS percentages, and wherein the skew model provides a different decay rate for different parameter values.

10. The method as claimed in claim 8, wherein identifying the parameter value that the skew model associates with the skew value, includes:

accessing a lookup table that associates skew values with respective parameter values; and selecting, as the identified parameter value, a parameter value that the lookup table associates with a skew value nearest in value to the skew value.

11. The method as claimed in claim 8, wherein converting the storage capacity percentage to the corresponding IOPS percentage, includes:

accessing a matrix having one or more columns storing respective storage capacity percentage for respective IOPS percentage, each of the columns associated with a respective parameter value;

selecting a column of the matrix associated with the identified parameter value; and outputting, as the IOPS percentage to be handled by the storage tier, the IOPS percentage corresponding to the storage capacity percentage from the selected column of the matrix.

12. The method as claimed in claim 8, wherein identifying the parameter value that the skew model associates with the skew value includes performing the following steps:

providing a candidate parameter value;

producing a computed level of skew that the skew model associates with the candidate parameter value;

testing whether the computed level of skew is at least as large as the skew value;

repeating the providing, producing, and testing steps with incremented candidate values until the testing step determines a candidate value for which a computed level of skew is at least as large as the skew value; and providing the determined candidate parameter value as the identified parameter value.

13. The method as claimed in claim 12, wherein producing the computed level of skew includes generating a cumulative skew representation for the candidate parameter value by accumulating discrete values of IOPS percentages from applying the skew model with the candidate parameter, the cumulative skew representation relating cumulative capacity percentages to respective cumulative IOPS percentages; and wherein generating the cumulative skew representation includes computing an integral of the respective relation between IOPS percentages to capacity percentages for the identified parameter value.

14. An apparatus, comprising:
memory; and
processing circuitry coupled to the memory, the memory storing instructions which, when executed by the processing circuitry, cause the processing circuitry to:

define a first workload for a data storage system, wherein the first workload includes a first storage capacity requirement, a first IOPS (input-output operations per second) requirement and a first skew value describing an expected workload profile;

determine, based on a policy, a percentage of the first storage capacity requirement to be allocated from a storage tier of the data storage system;

in accordance with the percentage of the first storage capacity requirement, allocate an amount of storage capacity from the storage tier that satisfies at least part of the first storage capacity requirement;

utilize the first skew value to map the percentage of the first storage capacity requirement to a corresponding IOPS percentage to be handled by the storage tier;

determine a first distribution of IOPS to the allocated storage capacity based on the IOPS percentage to be handled by the storage tier and the first IOPS requirement;

define a second workload for the data storage system, wherein the second workload is satisfied with the first storage capacity requirement and includes a second IOPS requirement and a second skew value describing an expected workload profile; and determine, based on the first distribution of IOPS and the second IOPS requirement and the second skew value, a second distribution of IOPS to the allocated storage capacity.

15. A computer program product including a set of non-transitory, computer-readable media having instructions which, when executed by processing circuitry, cause the processing circuitry to perform a method, the method comprising:

defining a first workload for a data storage system, wherein the first workload includes a first storage capacity requirement, a first IOPS (input-output operations per second) requirement and a first skew value describing an expected workload profile;

determining, based on a policy, a percentage of the first storage capacity requirement to be allocated from a storage tier of the data storage system;

in accordance with the percentage of the first storage capacity requirement, allocating an amount of storage capacity from the storage tier that satisfies at least part of the first storage capacity requirement;

utilizing the first skew value to map the percentage of the first storage capacity requirement to a corresponding IOPS percentage to be handled by the storage tier;

determining a first distribution of IOPS to the allocated storage capacity based on the IOPS percentage to be handled by the storage tier and the first IOPS requirement;

defining a second workload for the data storage system, wherein the second workload is satisfied with the first storage capacity requirement and includes a second IOPS requirement and a second skew value describing an expected workload profile; and determining, based on the first distribution of IOPS and the second IOPS requirement and the second skew value, a second distribution of IOPS to the allocated storage capacity.

* * * * *